United States Patent

Anandan et al.

[11] Patent Number: 6,049,619
[45] Date of Patent: *Apr. 11, 2000

[54] METHOD AND APPARATUS FOR DETECTING MOVING OBJECTS IN TWO- AND THREE-DIMENSIONAL SCENES

[75] Inventors: Padmanabhan Anandan, Princeton, N.J.; Michal Irani, Rehovot, Israel

[73] Assignee: Sarnoff Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,911

[22] Filed: Feb. 10, 1997

Related U.S. Application Data

[60] Provisional application No. 60/011,496, Feb. 12, 1996.

[51] Int. Cl.[7] .................................................. G06K 9/00
[52] U.S. Cl. ............................ 382/107; 382/103; 382/294
[58] Field of Search ................................. 382/103, 104, 382/106, 107, 294; 348/416

[56] References Cited

U.S. PATENT DOCUMENTS

| | | | |
|---|---|---|---|
| 4,573,191 | 2/1986 | Kidode et al. | 382/1 |
| 4,654,872 | 3/1987 | Hisano et al. | 382/1 |
| 4,985,856 | 1/1991 | Kaufman et al. | 364/522 |
| 5,034,986 | 7/1991 | Karmann et al. | 382/107 |
| 5,067,014 | 11/1991 | Bergen et al. | 382/107 |
| 5,074,491 | 12/1991 | Tyson | 244/3.11 |
| 5,249,035 | 9/1993 | Yamanaka | 356/376 |
| 5,257,209 | 10/1993 | Markandey | 382/107 |
| 5,259,040 | 11/1993 | Hanna | 382/107 |
| 5,339,104 | 8/1994 | Hong | 348/155 |
| 5,473,364 | 12/1995 | Burt | 348/47 |
| 5,557,684 | 9/1996 | Wang et al. | 382/107 |
| 5,572,258 | 11/1996 | Yokoyama | 348/415 |
| 5,581,638 | 12/1996 | Givens et al. | 382/294 |
| 5,586,231 | 12/1996 | Florent et al. | 395/125 |
| 5,629,988 | 5/1997 | Burt et al. | 382/107 |
| 5,649,032 | 7/1997 | Burt et al. | 382/294 |
| 5,680,487 | 10/1997 | Markandey | 382/103 |
| 5,706,416 | 1/1998 | Mann et al. | 395/127 |

OTHER PUBLICATIONS

Sawhney "Simplifyign motion and structure analysis using planar parallax and image warpping" Proceeding of 12 th International Conference on Pattern Recognition IEEE pp. 403–408, Oct. 1994.

Hsu et al. "Acurate computation of optical flow by using layered motion representations" Proceeding of 12 th International Conference on Pattern recognition IEEE pp. 743–746, Oct. 1994.

Thompson et al. "Detevting moving objects using the rigidity constraint" IEEE Transaction on Pattern Analysis and Mathine Intelligence vol. 15 No. 2 pp. 162–166, Feb. 1993.

Weber et al., "Rigid body segmentation and shape description from dense optical flow under weak perspective" Proceedings od 5 th International Conference on Computer Vision pp. 251–256, Jun. 1995.

(List continued on next page.)

*Primary Examiner*—Amelia Au
*Assistant Examiner*—Jingge Wu
*Attorney, Agent, or Firm*—William J. Burke

[57] ABSTRACT

A method and apparatus for detecting moving objects in both two-dimensional and three-dimensional scenes. The method repetitively applies a two-dimensional transformation to a plurality of images representing a scene to identify misaligned regions within the images. Any residual motion represented by the misaligned regions that may be classified as a moving object within the scene is further processed by a three-dimensional technique that removes parallax motion from the residual motion. The result is motion contained in an epipolar flow field which is only due to a moving object within the scene.

19 Claims, 5 Drawing Sheets

OTHER PUBLICATIONS

Ayer et al. "Layered representation of motion video using robust maximum–likelihood estimation of mixture models and MDL encoding" Proceedings of 5th International Conference on Computer Visition p. 777–784, Jun. 1995.

Sinclair "Motion segmentation and local structure" IEEE 4th International Conference on computer Vision pp 300–373, May 1993.

Wang et al. "Layered representation for motion analysis" Proceeding s of IEEE Conference on Computer Vision and Pattern Recognition pp. 361–366, Jun. 1993.

Burt et al. "Object tracking with moving camera" Proceedings of the Workship on Visual Motion 1989 IEEE pp. 2–12, Mar. 1989.

Baker et al. "Generalizing epipolar–plane image analysis on the spatiotemporal surface" IEEE, Apr. 1988.

Thomson et al. "Detecting moving objects" International Journal of computer vision V 4 n i pp. 39–57, Jan. 1990.

J. Bergen, P. Burt, K. Hanna, R. Hingorani, P. Jeanne, S. Peleg,"Dynamic Multiple–Motion Computation", Artificial Intelligence and Computer Vision, Elsevier Science Publishers B.V. (North Holland) 1991.

J. Bergen, P. Burt, R.Hingorani, S. Peleg, "A Three–Frame Algorithm for Estimating Two–Component Image Motion", IEEE Transactions on Pattern Analysis and Machine Intelligence, vol. 14, No. 9, Sep. 1992.

S. Carlsson, "Duality of Reconstruction and Positioning from Projective Views", Royal Institute of Technology, Sweden, IEEE 1995.

T. Darrell, A. Pentland, "Robust Estimation of a Multi–Layered Motion Representation", Vision Modeling Group, Massachusetts Inst. of Technology, 1991.

O. Faugeras "What can be seen in three dimensions with an uncalibratged stereo rig?", Proc. 2:nd ECCV, pp. 563–578.

R.Kumar, P. Anandan, K. Hanna, "Shape Recovery from Multiple Views: a Parallax Based Approach", 1994 Image Understanding Workshop, Nov. 13–16, Monterey, CA 1994.

J.M. Lawn, R. Cipolla, "Robust Egomotion Estimation from Affine Motion Parallax", Lecture Notes in Computer Science—vol. 800, Computer Vision—ECCV '94.

H.S. Sawhney, "3D Geometry From Planar Parallax", Proceedings IEEE Conference on Computervisions and Pattern Recognition, Seattle, Jun. 1994.

A. Shashua, "Projective Structure from Uncalibrated Images: Structure from Motionand Recognition", IEEE Transactions on Pattern Analysis and Machine Intelligence, vol. 16, No. 8, Aug. 1994.

A. Shashua, "Algebraic Functions for Recognition", IEEE Transactions on Pattern Analysis and Machine Intelligence, vol. 17, No. 8, Aug. 1995.

A. Shashua, N. Navab, "Relative Affine Structure: Theory and Application to 3D Reconstruction from Perspective Views", In Proceedings of the IEEE Conf. on Computer Vision and Pattern Recognition, pp. 483–489, Seattle, WA.

A. Shashua, M. Werman, "Trilinearity of three Perspective Views and its Associated Tensor", Proc. 5th ICCV, 1995.

M. Shizawa, "On Visual Ambiguities Due to Transparency in Motion and Stereo", ATR Communication Sysem Research Lab, Advnced Telecommunictions Research Institute, Japan, Computer Vision–ECCV 1992.

M. Shizawa, K. Mase, "Principle of Superposition: A Common Computiational Framework for Analysis of Multiple Motion", Proc. IEEE W okshop on Visual Motion, Princeton, NJ pp. 164–172, Oct. 1991.

Image Understanding Workshop, Proceedings of a Workshop held at Pittsburgh, Pennsylvania, Sep. 11–13, 1990.

A. Zisserman, S. Maybank, "A Case Against Epipolar Geometry", Applications of Invariance in Computer Visions, Springer LNCS 825 pp. 69–88 (1994).

Michael Irani, P. Anandan, Steve Hsu, "Mosaic Based Representations of Video Sequences and Their Applications", Fifth International Conference on Computer Vision, Jun. 20–23, 1995, IEEE Computer Society Press, pp 605–611.

Bergen et al., "Hierarchical Model–Based Motion Estimation", Proceedings of European Conference on Computer Vision–92, Springer–Verlag (1992).

K.J. Hanna, "Direct Multi–Resolution Estimation of Ego–Motion and Structure from Motion", Proc. IEEE Workshop on Visual Motion, Princeton, New Jersey Oct. 7–9, 1991, pp 156–162.

Hanna et al. "Combining Stereo andMotion Analysis for Direct Estimation of Scene Structure", Proc. Fourth Int. Conference on Computer Vision (ICCV '93), Berlin, Germany, May 1993.

METHOD AND APPARATUS FOR DETECTING MOVING OBJECTS IN TWO- AND THREE-DIMENSIONAL SCENES

This application claims the benefit of U.S. Provisional Application No. 60/011,496, filed Feb. 12, 1996.

The invention relates to image processing systems and, more particularly, to a method and apparatus for detecting moving objects within a scene represented by a plurality of images.

BACKGROUND OF THE DISCLOSURE

Moving object detection is an important aspect of image sequence analysis. It is necessary for surveillance applications, for guidance of autonomous vehicles, for efficient video compression, for smart tracking of moving objects, and many other applications. The two-dimensional motion observed in an image sequence is caused by three-dimensional camera motion (referred to as ego-motion) and by three-dimensional motions of independently moving objects. The key step in moving object detection is accounting for (or compensating for) the camera-induced image motion. After compensation for camera-induced image motion, the remaining residual motions must be due to moving objects.

The camera induced image motion depends both on the ego-motion parameters and the depth of each point in the scene from the camera. Estimating all of these physical parameters (namely, ego-motion and depth) to account for the camera-induced motion is, in general, an inherently ambiguous problem. When the scene contains large depth variations, these parameters may be recovered. These scenes are referred to as three-dimensional scenes. However, in two-dimensional scenes, namely when the depth variations within the scene are not significant, the recovery of the camera and scene parameters is usually not robust or reliable.

An effective approach to accounting for camera induced motion in two-dimensional scenes is to model the image motion in terms of a global two-dimensional parametric transformation. This approach is robust and reliable when applied to flat (planar) scenes, distant scenes, or when the camera is undergoing only rotations and zooms. However, the two-dimensional approach cannot be applied to three-dimensional scenes.

Therefore, two-dimensional algorithms and three-dimensional algorithms address the moving object detection problem in very different types of scenarios. These are two extremes in a continuum of scenarios: flat two-dimensional scenes (i.e., no three-dimensional parallax) vs. three-dimensional scenes with dense depth variations (i.e., dense three-dimensional parallax). Both classes fail on the other extreme case or even on the intermediate case (when three-dimensional parallax is sparse relative to amount of independent motion).

In real image sequences, it is not always possible to predict in advance which situation (two-dimensional or three-dimensional) will occur. Moreover, both types of scenarios can occur within the same sequence, with gradual transitions between them. Unfortunately, no single class of techniques (two-dimensional or three-dimensional) can address the general moving object detection problem. It is not practical to constantly switch from one set of techniques to another, especially since neither class treats the intermediate case very well.

Therefore, a need exists in the art for a unified approach for detecting moving objects in both two-dimensional and three-dimensional scenes.

SUMMARY OF THE INVENTION

The present invention provides a unified approach to detecting moving objects in both two-dimensional and three-dimensional scenes, with a strategy to gracefully bridge the gap between those two extremes. The approach uses a stratified moving object detection technique which gradually increases in complexity as scene complexity increases: (i) scenarios in which the camera induced motion can be modeled by a single two-dimensional parametric transformation, (ii) those in which the camera induced motion can be modeled in terms of a small number of layers of parametric transformations, and (iii) general three-dimensional scenes, in which a more complete parallax motion analysis is required. The system of the present invention applies each of these approaches sequentially to an imaged scene, thus improving, at each step, the accuracy of the detection. In particular, a two-dimensional parametric motion compensation technique forms the basis to the solution of a multiple layer motion detection technique, and the output of the multiple-layer motion compensation technique forms the basis to the solution of a more general three-dimensional motion detection technique. Careful treatment is given to the intermediate case, when three-dimensional parallax motion is sparse relative to the amount of independent motion.

The goal in taking this approach is to develop a strategy for moving object detection, so that the motion detection technique is tuned to match the complexity of the problem and the availability of information at any time.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
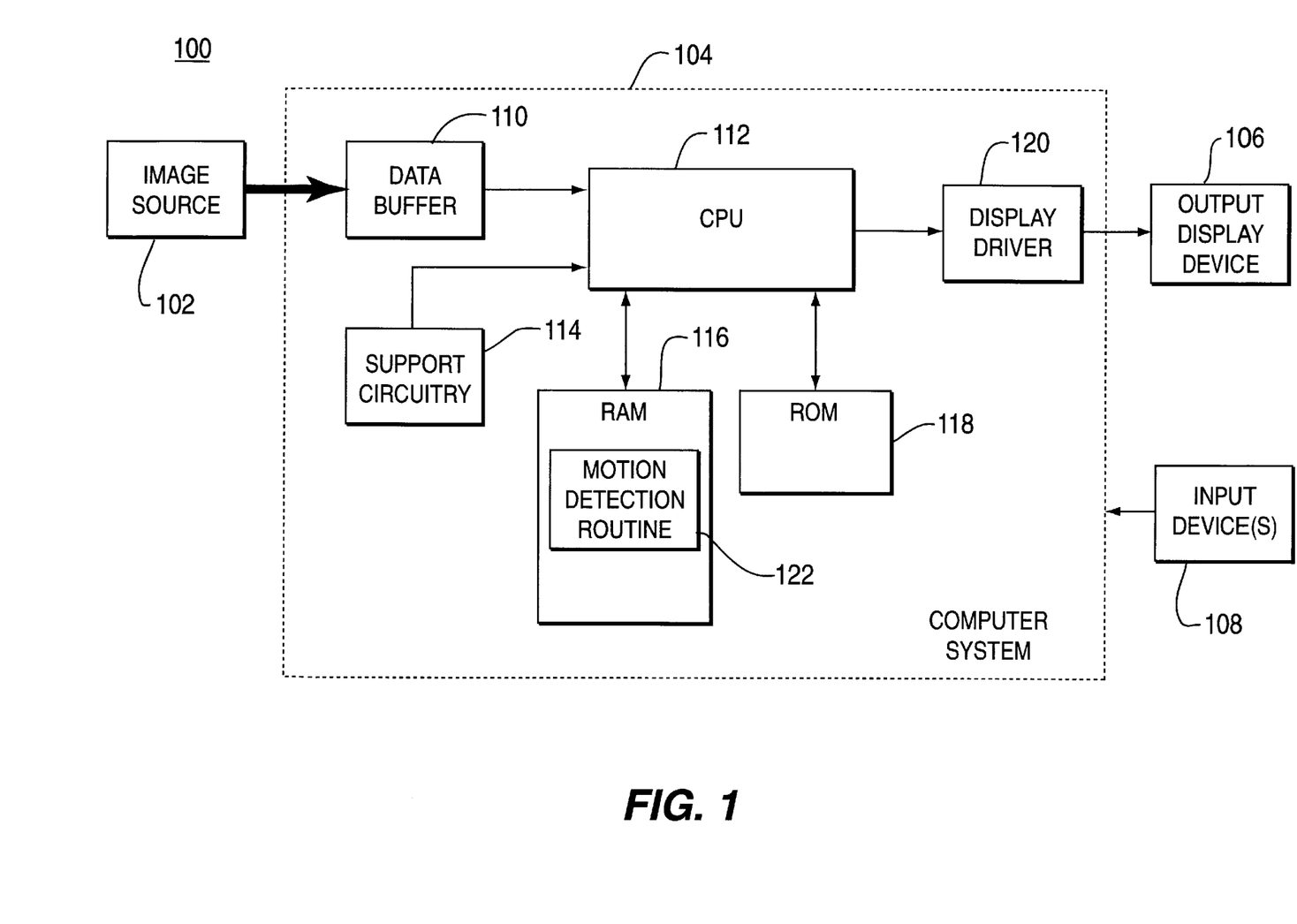
FIG. 1 depicts a block diagram of a motion detection system.

FIG. 1 depicts a block diagram of a motion detection system 100 of the present invention. The system contains an image source 102, a computer system 104, one or more output devices 106 and one or more input devices 108. The image source 102 can be a video camera, an infrared camera, or some other sensor that generates a series of two-dimensional images representing a scene. Alternatively, the image source is a storage device such as a video tape recorder, disk drive or some other means for storing sequential images representing a scene. The images are generally provided by the image source as digital images; however, if the images are provided as analog images, a digitizer (not shown) can simply be added to the system as part of he image source 102.

The general purpose computer 104 facilitates image processing, motion detection and image display. Specifically, the computer system contains a data buffer 110, a central processing unit (CPU) 112, support circuitry 114, random access memory (RAM) 116, read only memory (ROM) 118, and a display driver 120. Additionally, a user interacts with the computer system through one or more input devices 108 such as a keyboard, mouse, trackball, touchpad, and the like. Also, the computer system displays the images and various graphical interface displays (screens) on the output display device 106 such as a computer monitor. Alternatively, the computer system may also interact with other output display devices such as a printer or plotter to provide a "hard copy" of any display that appears on the computer monitor.

The data buffer 110 provides data rate equalization (frame buffering) between the image source and the CPU. Typically, this buffer is a first-in, first-out (FIFO) buffer. Such buffers are typically used to provide a constant data rate to the CPU while providing flexibility in the data rates that can be generated by an image source.

The CPU 112 is typically a general purpose processor such as a PowerPC, Pentium, or some other generally available processor. PowerPC is a registered trademark of International Business Machines of Armonk, New York and Pentium is a registered trademark of Intel Corporation of Santa Clara, Calif. Since the software implementation of the present invention is not required to execute on any specific processor, the routines of the present invention can be executed upon any type of processor or combination of processors in a parallel processing computer environment. Additionally, the computer system could be a real-time video processor rather than a specially programmed general purpose computer.

The CPU 112 operates in conjunction with various other circuits such as RAM 116, ROM 118 and support circuitry 114 such as co-processor(s), clock circuits, cache, power supplies and other well-known circuits. The operation and interrelationship of these various computer components is well-known in the art and does not require further explanation. The display driver 120 may be a video card, printer driver or other common driver software or hardware as required by the output device(s) 106.

The RAM 116 stores the software implementation of the present invention. Typically, the routines of the invention are stored in a mass storage device (not shown) and recalled for temporary storage in the RAM 116 when executed by the CPU 112. The invention is implemented as the motion detection routine 122.

Figure 2:
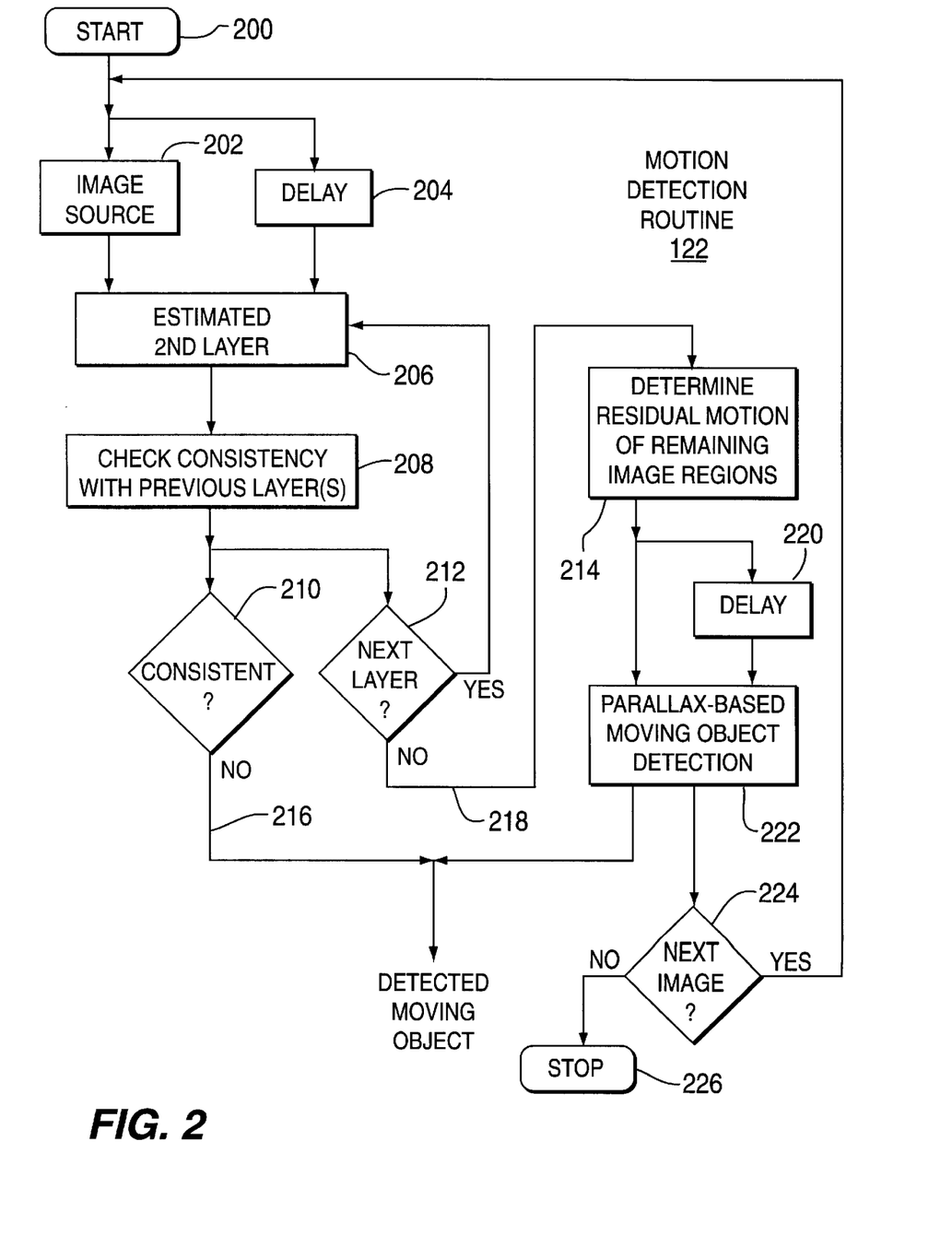
FIG. 2 depicts a flow diagram of a motion detection routine that is executed by the motion detection system of FIG. 1.

FIG. 2 is a flow diagram depicting the motion detection routine 122. The routine begins at step 200 and proceeds to step 202 where an image is provided by the image source (or recalled from mass storage). At step 204, the first image is delayed and the second image is provided. As such, two sequential images are to be processed. At step 206, the routine applies a two-dimensional transformation to the image pair to estimate a two-dimensional layer.

When a scene viewed from a moving camera is at such a distance that the scene can be approximated by a flat two-dimensional surface, then the camera induced motion can be modeled by a single global two-dimensional parametric transformation between a pair of successive image frames representing the scene. The transformation is:

$$\begin{bmatrix} u(x,y) \\ v(x,y) \end{bmatrix} = \begin{bmatrix} p_1 x + p_2 y + p_5 + p_7 x^2 + p_8 xy \\ p_3 x + p_4 y + p_6 + p_7 xy + p_8 y^2 \end{bmatrix} \quad (1)$$

where $(u(x,y), v(x,y))$ denotes the image velocity at the point $(x,y)$. Equation (1) is an approximate description of the instantaneous image motion field induced by a planar surface viewed from a moving camera. In addition, this transformation also describes the two-dimensional image motion of an arbitrary three-dimensional scene undergoing camera rotations, zooms, and small camera translations. More importantly, when the overall three-dimensional range (Z) to the scene from the camera is much greater than the variation of the range within the scene ($\Delta Z$), equation (1) describes the image motion field to sub-pixel accuracy.

The following disclosure refers to scenes that satisfy one or more of the above-mentioned conditions (and hence scenes where Equation (1) is applicable), as two-dimensional scenes. In practice, these conditions are often satisfied in remote surveillance applications, when narrow field-of-view (FOV) cameras (typically five degrees or less) are used to detect moving objects in a distant scene (typically at least 1 km away).

Although any two-dimensional motion detection technique may be used as part of the invention, under the foregoing conditions and for completeness, the motion estimation technique described in M. Irani, B. Rousso, and S. Peleg, "Computing Occluding and Transparent Motions", International Journal of Computer Vision, 12:5—Feb. 16, 1994 is described below as an illustrative technique. This technique "locks" onto a "dominant" parametric motion between the image pair, even in the presence of independently moving objects. It does not require prior knowledge of the regions of support for the dominant motion in the image plane. This computation provides only the two-dimensional motion parameters of the camera-induced motion, but no explicit three-dimensional shape or motion information.

Once the dominant two-dimensional parametric motion has been estimated between two images, the image regions corresponding to that motion are considered belonging to a single "layer".

When the camera motion includes a translational component, and the scene is not planar or is not sufficiently distant, then a single two-dimensional parametric motion is insufficient for modeling the camera-induced motion. Aligning two images with respect to a two-dimensional parametric transformation may bring into alignment a large portion of the scene, which corresponds to a planar (or a remote) part of the scene. However, any other (e.g., near) portions of the scene that enter the field-of-view cannot be aligned by the dominant two-dimensional parametric transformation. These out-of-plane scene points, although they have the same three-dimensional motion as the planar points, have substantially, different induced two-dimensional motions. The differences in two-dimensional motions are called three-dimensional parallax motion. Effects of parallax are only due to camera translation and three-dimensional scene variations. Camera rotation or zoom do not cause parallax.

There is therefore a need to refine the motion detected using the two-dimensional transformation technique of step 206. The next processing step (step 208) involves fitting multiple planar surfaces (i.e., multiple two-dimensional "layers") to the scene.

When the scene is piecewise planar, or is constructed of a few distinct portions at different depths, then the camera-induced motion can be accounted for by a few layers of two-dimensional parametric transformations. This case is very typical of outdoor surveillance scenarios, especially when the camera FOV is narrow. After a two-dimensional layer is extracted in the aforementioned fashion, the routine proceeds to reexecute the same two-dimensional motion estimation technique of step 206. However, this time the technique is only applied to the remaining regions of the images. The re-execution detects the next dominant two-dimensional transformation and its region of support within the image. As such, the routine produces "layers" of aligned image regions. By repeatedly executing step 206, the routine extracts additional layers. For each additional layer, the two images are aligned according to the two-dimensional parametric transformation of that layer, and the misaligned image regions are detected and segmented. Each "two-dimensional layer" is continuously tracked in time by using a segmentation mask derived from the segmentation process.

In the simplest form, moving objects are detected as image regions that are inconsistent with the image motion of any of the two-dimensional layers. A moving object is not detected as a layer, if the moving object is relatively small. However, if the object is large, the object may itself be detected as a two-dimensional layer. Consequently, at step 208, each layer is checked for its consistency with a previous layer(s). A few cues (see below) can be used to distinguish between moving objects and static scene layers. If the routine deems, at step 210, that two layers are inconsistent, then a moving object is deemed detected. This moving object is extracted from the routine via path 216.

After checking consistency of the new layer, the routine proceeds to the NEXT LAYER query at step 212. The routine continues processing layers until the routine deems the two-dimensional alignment process complete. The two-dimensional alignment process is deemed complete when one of any number of completion criteria are fulfilled. These criteria include, for example, concluding the remaining unaligned regions are too small for numerically stable two-dimensional motion estimation to be accomplished at step 206 or deeming at least the previous two layers to be consistent with one another at step 210. Until a criteria is met, routine 122 continues along the YES path emanating from query 212. Once the two-dimensional processing is deemed complete and no further layers are to be processed, the routine proceeds to the three-dimensional processing of step 214.

One of the cues used for determining consistency is that moving objects produce discontinuities in two-dimensional motion everywhere on their boundary, as opposed to static two-dimensional layers. Therefore, if a moving object is detected as a layer, it can be distinguished from real scene layers due to the fact that it appears "floating" in the air (i.e., has depth discontinuities all around it). A real scene layer, on the other hand, is always connected to another part of the scene (layer). On the connecting boundary, the two-dimensional motion is continuous. If the connection to other scene portions is outside the FOV, then that layer is adjacent to the image boundary. Therefore, a two-dimensional layer which is fully contained in the FOV, and exhibits two-dimensional motion discontinuities all around it, is necessarily a moving object.

Other cues, such as detecting negative depth and the like can also be used.

Although a sequential one at a time layer extraction technique was described above, note that, in general, other layer extraction techniques are equally applicable. For example, the invention may use a technique for simultaneous extraction of all the layers that is described in S. Ayer and H. Sawhney, "Layered Representation of Motion Video Using Robust Maximum-likelihood Estimation of miture Models and mdl Encoding", International Conference on Computer Vision, pages 777–784, Cambridge, Mass., June 1995. When using this technique steps 206–212 of routine 122 have to be appropriately modified.

While two-dimensional analysis techniques using layers are adequate to handle a large number of imaging situations, there are cases when three-dimensional analysis is required. An example of such a situation is a cluttered scene which contains many small objects at multiple depths (these could be urban scenes or indoor scenes). Thus, the invention includes, at step 214, a process for generating the residual motion remaining after the two-dimensional layer processing. When the two-dimensional technique has been exhausted, residual motion estimation is estimated for the remaining image region and parallax based analysis is then performed to classify these regions as either a portion of the background scene or a moving object.

This residual motion represents moving object motion as well as parallax motion within the first and second images. Typically, parallax motion analysis requires three images. Thus, delay 220 is used to retain the residual motion of the first and second images until the residual motion between the second and third images is available from step 214. The residual motion within the three images forms an input to step 222. Step 222 is a process step that handles the more complex threedimensional scenes. At step 224, the routine queries whether the next image should be processed. If the query is affirmatively answered, the routine proceeds to step 202. Otherwise, the routine stops at step 226.

The key observation that enables us to extend the two-dimensional parametric registration approach to general three-dimensional scenes is the following: the plane registration process of steps 206, 208, 210 and 212 removes all effects of camera rotation, zoom, and calibration, without explicitly computing them. The residual image motion after the plane registration is due only to the translational motion of the camera and to the deviations of the scene structure from the planar surface. Hence, the residual motion is an epipolar flow field. This observation has led to the so-called "plane+parallax" approach to three-dimensional scene analysis. This approach to motion detection is described in commonly assigned U.S. patent application Ser. No. 08/493, 632 filed Jun. 22, 1995 and herein incorporated by reference.

Figure 3:
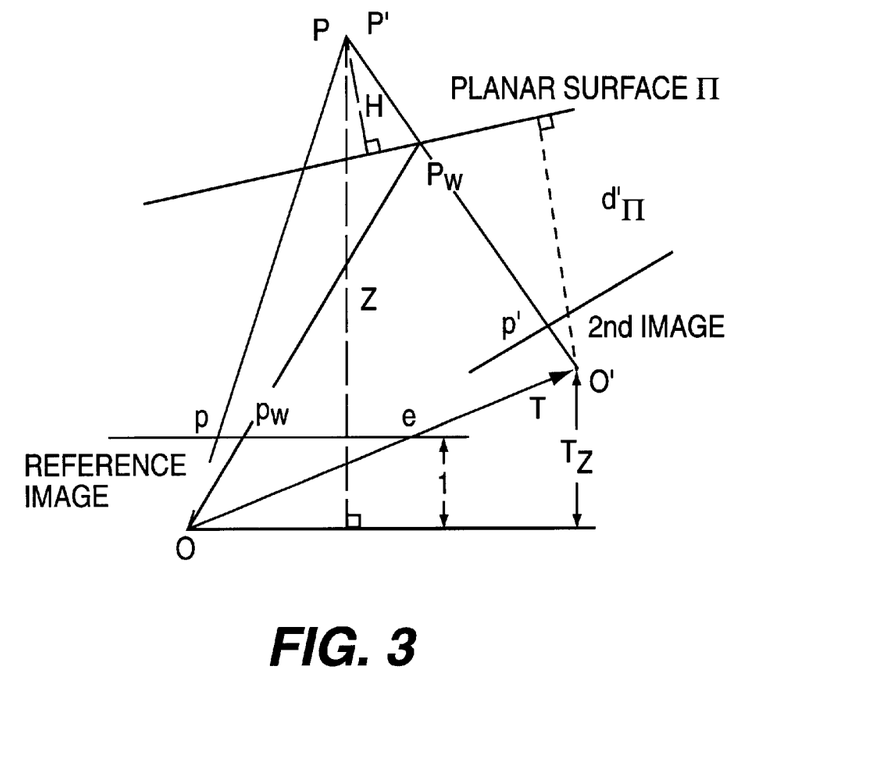
FIGS. 3 and 4 provide a geometric illustration of planar parallax.
Figure 4:
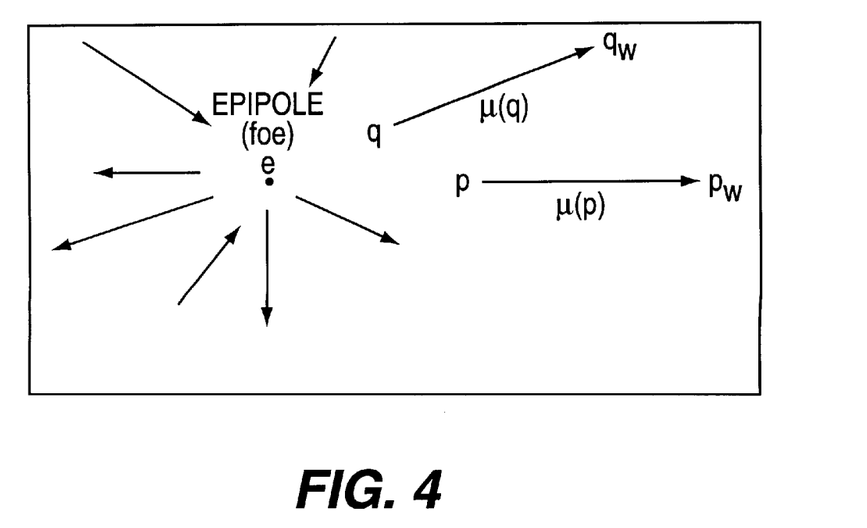

FIGS. 3 and 4 provide a geometric illustration of planar parallax, where FIG. 3 depicts a geometric interpretation of the problem and FIG. 4 depicts an epipolar field of the residual parallax displacements. Let $\vec{P}=(X,Y,Z)^T$ and $\vec{P}'=(X',Y',Z')^T$ denote the Cartesian coordinates of a scene point with respect to two different camera views, respectively. Let $\vec{p}=(x,y)^T$ and $\vec{p}=(x',y')^T$ respectively denote the corresponding coordinates of the corresponding image points in the two image frames.

Let $\vec{T}=(T_x,T_y,T_z)$ denote the camera translation between the two views. Let $\vec{P}$ denote a (real or virtual) planar surface in the scene which is registered by the two-dimensional parametric registration process. It can be shown that the two-dimensional image displacement of the point $\vec{P}$ can be written as $$\vec{u}=(\vec{p}'-\vec{p})=\vec{u}_\pi+\vec{\mu}, \qquad (2)$$

where $\vec{u}_\pi$ denotes the planar part of the two-dimensional image motion (the homography due to Π), and $\vec{\mu}$ denotes the residual planar parallax two-dimensional motion. The homography due to Π results in an image motion field that can be modeled as a two-dimensional parametric transformation. In general, this transformation is a projective transformation, however, in the case of instantaneous camera motion, it can be well approximated by the quadratic transformation shown in Equation (1).

When $T_z \neq 0$: (3)

$$\vec{u}_\pi = (\vec{p}' - \vec{p}_w); \vec{\mu} = \gamma \frac{T_z}{d'_\pi}(\vec{e} - \vec{p}_w)$$

where $\vec{p}_w$ denotes the image point in the first frame which results from warping the corresponding point $\vec{p}'$ in the second image, by the two-dimensional parametric transformation of the plane Π. The two-dimensional image coordinates of the epipole (or the focus-of-expansion, FOE) in the first frame are denoted by $\vec{e}$, and $d'_\pi$ is the perpendicular distance from the second camera center to the reference plane (see FIG. 3). γ is a measure of the three-dimensional shape of the point $\vec{P}$. In particular, γ=H/Z, where H is the perpendicular distance from the $\vec{P}$ to the reference plane, and Z is the "range" (or "depth") of the point $\vec{P}$ with respect to the first camera. We refer to γ as the projective three-dimensional structure of point $\vec{P}$. In the case when $T_z=0$, the parallax motion $\mu$ has a slightly different form: $\mu=\gamma/d'_\pi \vec{t}$ where $t=(T_x,T_y)^T$.

The plane+parallax decomposition is more general than the more traditional decomposition in terms of rotational and translational motion (and includes the traditional decomposition as a special case). In addition, (i) the planar homography (i.e., the two-dimensional parametric planar transformation) compensates for camera rotation, zoom and other changes in the internal parameters of the camera, (ii) this approach does not require any prior knowledge of the camera internal parameters (in other words, no prior camera calibration is needed), and (iii) the planar homography being a two-dimensional parametric transformation can be estimated in a more stable fashion than the rotation and translation parameters. In particular, it can be estimated even when the camera field-of-view is limited, the depth variations in the scene are small, and in the presence of independently moving objects.

Figure 5:
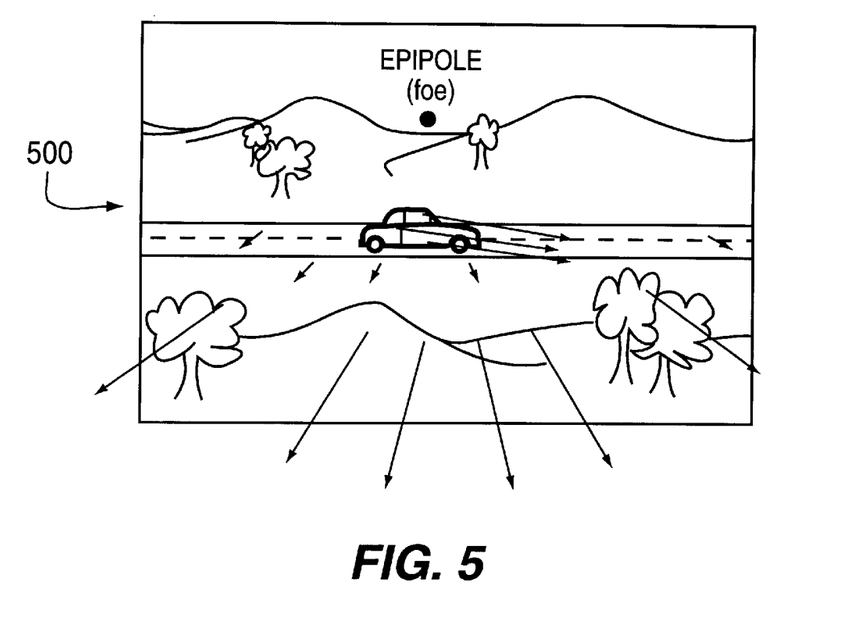
FIGS. 5 and 6 depict three-dimensional scenes having parallax.

The residual parallax displacements are due to the camera translational component alone, they form a radial field centered at the epipole/FOE. If the epipole is recovered, all that is required for detecting moving objects is the verification whether the residual two-dimensional displacement associated with a given point is directed towards/away from the epipole. This is known as the epipolar constraint. Residual two-dimensional motion that violates this requirement can only be due to an independently moving object. FIG. 5 graphically illustrates this situation 500, where moving object detection is based on an inconsistency in the parallax motion with a radial epipolar motion field.

Figure 6:
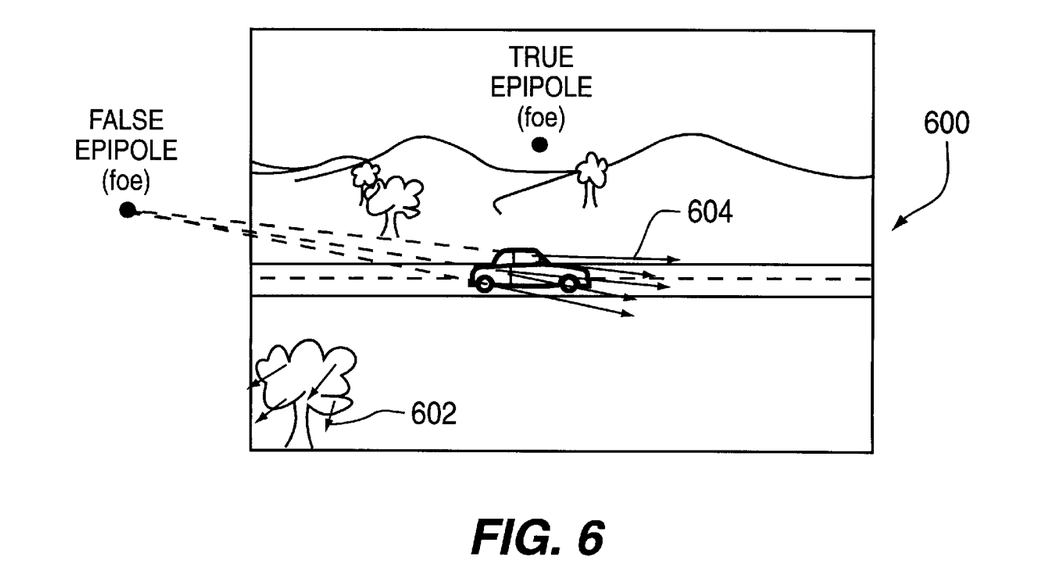

While the plane+parallax strategy works generally well when the epipole (FOE) recovery is possible, its performance depends critically on the ability to accurately estimate the epipole. Since the epipole recovery is based on the residual motion vectors, those vectors that are due to the moving object are likely to bias the estimated epipole away from the true epipole. (Note that this is true even of the "direct" methods that do not explicitly recover the residual motion vectors, but instead rely on spatiotemporal image gradients, since the information provided by the points on moving objects will influence the estimate.) The problem of estimating the epipole is acute when the scene contains sparse parallax information and the residual motion vectors due to independently moving object are significant (either in magnitude or in number). A graphic illustration of such a situation 600 is provided in FIG. 6, where a false epipole is estimated when the three-dimensional parallax is sparse relative to independent object motion. In the situation depicted in this figure, the magnitude and the number of parallax vectors 602 on the tree is considerably smaller than the residual motion vectors 604 on the independently moving car. As a result, the estimated epipole is likely to be consistent with the motion of the car (in the figure this would be somewhere outside the field-of-view on the left side of the image) and the tree will be detected as an independently moving object.

There are two ways to overcome the difficulties in estimating the epipole. The first is to use prior knowledge regarding the camera/vehicle motion to reject potential "outliers" (namely the moving objects) during the estimation. However, if only limited parallax information is available, any attempt to refine this prior information will be unstable. A more general approach would be to defer, or even completely eliminate, the computation of the epipole.

The following disclosure presents a method for moving object detection in the difficult "intermediate" cases, when three-dimensional parallax information is sparse relative to independent motion information. This approach can be used to bridge the gap between the two-dimensional cases and the dense three-dimensional cases.

Figure 7:
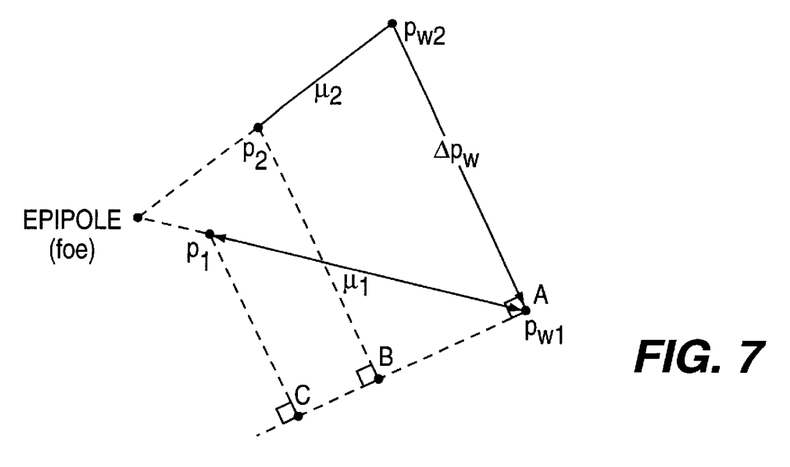
FIGS. 7, 8, and 9 depict a geometric illustration of pairwise parallax constraint.

Given the planar-parallax displacement vectors $\vec{\mu}_1$ and $\vec{\mu}_2$ of two points that belong to the static background scene, their relative three-dimensional projective structure $$\frac{\gamma_2}{\gamma_1}$$

is given by:

$$\frac{\gamma_2}{\gamma_1} = \frac{\vec{\mu}_2^T(\Delta\vec{p}_w)_\perp}{\vec{\mu}_1^T(\Delta\vec{p}_w)_\perp}$$ (4)

where, as shown in FIG. 7, $\vec{p}_1$ and $\vec{p}_2$ are the image locations (in the reference frame) of two points that are part of the static scene, $\Delta\vec{p}_w = \vec{p}_{w_2} - \vec{p}_{w_1}$, the vector connecting the "warped" locations of the corresponding second frame points (as in Equation (3)), and $\vec{v}_\perp$ signifies a vector perpendicular to $\vec{v}$. Also, $$\frac{\gamma_2}{\gamma_1} = \frac{AB}{AC}$$

as depicted in FIG. 7.

Equation 4 is derived by the following proof which is also disclosed in commonly assigned U.S. patent application Ser. No. 60/011,524 filed simultaneously herewith (attorney docket number 12041P) and herein incorporated by reference. Let $\vec{\mu}_1$ and $\vec{\mu}_2$ be the planar-parallax displacement vectors of two points that belong to the static background. From Equation (3), it is known that $$\vec{\mu}_1 = \gamma_1 \frac{T_z}{d'_\pi}(\vec{e} - \vec{p}_{w_1}); \vec{\mu}_2 = \gamma_2 \frac{T_z}{d'_\pi}(\vec{e} - \vec{p}_{w_2}) \quad (5)$$

Therefore, $$\vec{\mu}_1 \gamma_2 - \vec{\mu}_2 \gamma_1 = \gamma_1 \gamma_2 \frac{T_z}{d'}(\vec{p}_{w_2} - \vec{p}_{w_1}) \quad (6)$$

This last step eliminated the epipole $\vec{e}$. Equation (6) entails that the vectors on both sides of the equation are parallel. Since $$\gamma_1 \gamma_2 \frac{T_z}{d'}$$

is a scalar, then:

$$(\vec{\mu}_1 \gamma_2 - \vec{\mu}_2 \gamma_1) \parallel \Delta \vec{p}_w, \text{ where } \Delta \vec{p}_w = (\vec{p}_{w_2} - \vec{p}_{w_1}).$$

This leads to the pairwise parallax constraint $$(\vec{\mu}_1 \gamma_2 - \vec{\mu}_2 \gamma_1)^T (\Delta \vec{p}_w)_\perp = 0 \quad (7)$$

When $T_Z=0$, a constraint stronger than Equation (7) can be derived:

$$\left(\vec{\mu}_1 \frac{\gamma_2}{\gamma_1} - \vec{\mu}_2\right) = 0,$$

however, Equation (7) still holds. This is important, as the system of the present invention does not have a-priori knowledge of $T_Z$ to distinguish between the two cases. From Equation (7), Equation (4) is easily derived.

Note that this constraint directly relates the relative projective structure of two points to their parallax displacements alone: no camera parameters, in particular the epipole (FOE), are involved. Neither is any additional parallax information required at other image points.

Given the planar-parallax displacement vectors of two points that belong to the background static scene over three frames, the following constraint must be satisfied:

$$\frac{\vec{\mu}_2^{jT}(\Delta \vec{p}_w)_\perp^j}{\vec{\mu}_1^{jT}(\Delta \vec{p}_w)_\perp^j} - \frac{\vec{\mu}_2^{kT}(\Delta \vec{p}_w)_\perp^k}{\vec{\mu}_1^{kT}(\Delta \vec{p}_w)_\perp^k} = 0 \quad (8)$$

where $\vec{\mu}_1^j, \vec{\mu}_1^j$ are the parallax displacement vectors of the two points between the reference frame and the j-th frame, $\vec{\mu}_1^k, \vec{\mu}_2^k$ are the parallax vectors between the reference frame and the k-th frame, and $(\Delta \vec{p}_w)^j, (\Delta \vec{p}_w)^k$ are the corresponding distances between the warped points as in Equation (4) and FIG. 7.

Equation (8) is derived as follows. The relative projective structure $$\frac{\gamma_2}{\gamma_1}$$

is invariant to camera motion. Therefore, using Equation (4), for any two frames j and k:

$$\frac{\gamma_2}{\gamma_1} = \frac{\vec{\mu}_2^{jT}(\Delta \vec{p}_w)_\perp^j}{\vec{\mu}_1^{jT}(\Delta \vec{p}_w)_\perp^j} = \frac{\vec{\mu}_2^{kT}(\Delta \vec{p}_w)_\perp^k}{\vec{\mu}_1^{kT}(\Delta \vec{p}_w)_\perp^k} \quad (9)$$

As in the case of the parallax based shape constraint (Equation (4)), the parallax based rigidity constraint (Equation (8)) relates the parallax vectors of pairs of points over three frames without referring to the camera geometry (especially the epipole/FOE). Furthermore, this constraint does not even explicitly refer to the structure parameters of the points in consideration. The rigidity constraint (8) can therefore be applied to detect inconsistencies in the three-dimensional motion of two image points (i.e., say whether the two image points are projections of three-dimensional points belonging to a same or different three-dimensional moving objects) based on their parallax motion among three (or more) frames alone, without the need to estimate either camera geometry, camera motion, or structure parameters, and without relying on parallax information at other image points. A consistency measure is defined as the left-hand side of Equation (8), after multiplying by the denominators (to eliminate singularities). The farther this quantity is from 0, the higher is the three-dimensional-inconsistency of the two points.

Figure 8:
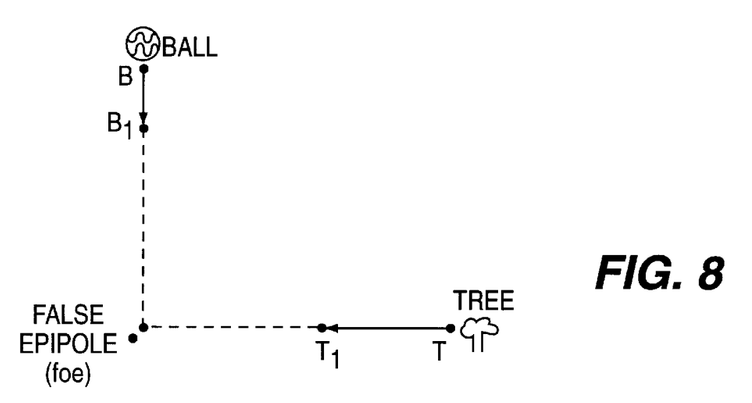
Figure 9:
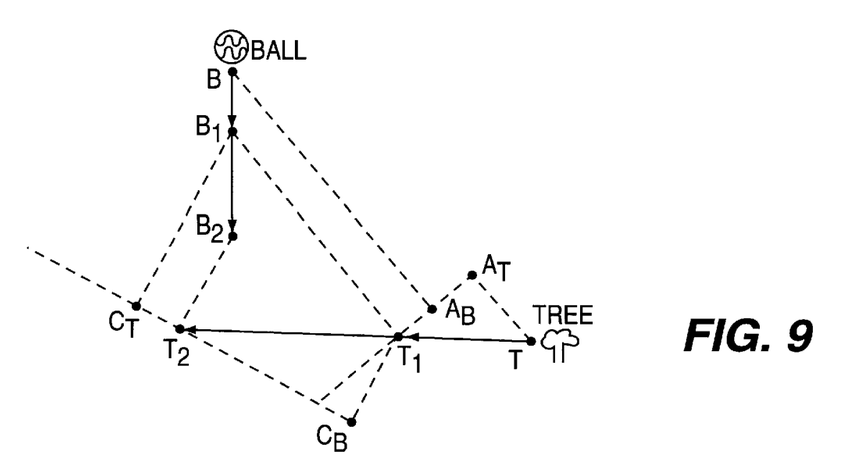

FIGS. 8 and 9 graphically depict an example of a configuration in which estimating the epipole in presence of multiple moving objects can be very erroneous, even when using clustering techniques in the epipole domain. Relying on the epipole computation to detect inconsistencies in three-dimensional motion fails in detecting moving objects in such cases. In FIGS. 8 and 9, the camera is translating to the right. The only static object with pure parallax motion is that of the tree. The ball, on the other hand, is falling independently. An epipole for this scenario could incorrectly be computed as e. The false epipole is consistent with both motions. However, as shown in FIG. 9, over three frames of the scenario in FIG. 8, the rigidity constraint detects three-dimensional inconsistency within the sequence of images. This inconsistency arises since $$\frac{\gamma_2}{\gamma_1}(\text{frame } 1.2) = \frac{T_1 A_B}{T_1 A_T} \neq \frac{T_2 C_B}{-T_2 C_T} = \frac{\gamma_2}{\gamma_1}(\text{frame } 1.3) \text{ (see FIG. 9)}.$$

In this example, even the signs do not match.

The parallax rigidity constraint (Equation (8)) can be applied to detect inconsistencies in the three-dimensional motion of one image point relative to another directly from their "parallax" vectors over multiple (three or more) frames, without the need to estimate either camera geometry, camera motion, or shape parameters. This provides a useful mechanism for clustering (or segmenting) the "parallax" vectors (i.e., the residual motion after planar registration) into consistent groups belonging to consistently three-dimensional moving objects, even in cases such as in FIG. 8, where the parallax information is minimal, and the independent motion is not negligible.

The ability of the parallax rigidity constraint (Equation (8)) to detect three-dimensional-inconsistency with respect to a single point, provides a natural way to bridge between two-dimensional algorithms (which assume that any two-dimensional motion different than the planar motion is an independently moving object), and three-dimensional algorithms (which rely on having prior knowledge of a consistent set of points, or alternatively, dense parallax data).

Previous approaches to the problem of moving object detection can be broadly divided into two classes: two-dimensional algorithms which apply when the scene can be approximated by a flat surface and/or when the camera is only undergoing rotations and zooms, and three-dimensional algorithms which work well only when significant depth variations are present in the scene and the camera is translating. These two classes of algorithms treat two extremes in a continuum of scenarios: no three-dimensional parallax (two-dimensional algorithms) vs. dense three-dimensional parallax (three-dimensional algorithms). Both classes fail on the other extreme case or even on the intermediate case (when three-dimensional parallax is sparse relative to amount of independent motion). The invention is a unified approach to handling moving object detection in both two-dimensional and three-dimensional scenes, with a strategy to gracefully bridge the gap between those two extremes. The present invention is based on a stratification of the moving object detection problem into scenarios which gradually increase in their complexity. The invention uses a set of techniques that match this stratification. These techniques progressively increase in their complexity, ranging from two-dimensional techniques to more complex three-dimensional techniques. Moreover, the computations required for the solution to the problem at one complexity level become the initial processing step for the solution at the next complexity level.

Although various embodiments which incorporate the teachings of the present invention have been shown and described in detail herein, those skilled in the art can readily devise many other varied embodiments that still incorporate these teachings.

What is claimed is:

1. A method for detecting object motion within a sequence of images representing a scene, comprising:
    (a) selecting a plurality of images from said sequence of images;
    (b) applying a two dimensional transformation to said plurality of images to align stationery regions of said plurality of images and identify a misaligned region of said plurality of images;
    (c) computing a parallax rigidity constraint that identifies a parallax motion component of the misaligned region; and
    (d) processing said parallax motion component to detect a moving object within the scene.

2. The method of claim 1 wherein step (b) further comprises the steps of:
    (a') applying a two dimensional transformation to said plurality of images to align regions of said plurality of images and identify a plurality of misaligned regions of said plurality of images;
    (b') segmenting said misaligned regions to produce segmented regions;
    (c') iteratively aligning and segmenting the misaligned regions until a remaining misaligned region fulfills a criteria that identifies the remaining misaligned region as residual motion within said plurality of images.

3. The method of claim 2 wherein said segmenting step forms a layer containing said segmented regions.

4. The method of claim 3 wherein the segmenting step uses a segmentation mask to track the segmented regions over time.

5. The method of claim 2 wherein step (c') further comprises the step of:
    determining if at least one of said plurality of misaligned regions is a moving object by determining if the misaligned region is consistent with the segmented regions.

6. The method of claim 5 wherein a misaligned region is deemed inconsistent with the segmented region if the misaligned region produces discontinuities in the two-dimensional motion everywhere along a boundary of the misaligned region.

7. The method of claim 5 further comprising the step of:
    determining whether the misaligned region contains depth discontinuities that identify the misaligned region as a moving object.

8. The method of claim 1 wherein the processing step (d) further comprises the step of:
    identifying a portion of the parallax motion component that does not conform to the parallax rigidity constraint as the moving object.

9. Apparatus for detecting object motion within a sequence of images representing a scene comprising:
    means for selecting a plurality of images from said sequence of images;
    means for applying a two-dimensional transformation to said plurality of images to align regions of said plurality of images and identify a misaligned region of said plurality of images;
    means for computing a parallax rigidity constraint that identifies a parallax motion component of the misaligned region; and
    means for processing said parallax motion component to detect a moving object within the scene.

10. The apparatus of claim 9 wherein said means for applying a two-dimensional transformation is iteratively applied to the plurality of images by segmenting the misaligned regions from the aligned regions to form a plurality of layers and aligning each layer with each other layer to identify a further misaligned regions and further layers until the layers cannot be aligned.

11. The apparatus of claim 10 wherein said means for processing said parallax motion component further comprises:
    means for identifying a portion of the parallax motion component that violates the parallax rigidity constraint as the moving object within the scene.

12. A computer readable medium having stored thereon a plurality of instructions including instructions which, when executed by a processor, cause the processor to perform the steps of:
    (a) selecting a plurality of images from said sequence of images;
    (b) applying a two dimensional transformation to said plurality of images to align stationery regions of said plurality of images and identify a misaligned region of said plurality of images;
    (c) computing a parallax rigidity constraint that identifies a parallax motion component of the misaligned region; and
    (d) processing said parallax motion component to detect a moving object within the scene.

13. The method of claim 12 wherein step (b) further comprises the steps of:
    (a') applying a two dimensional transformation to said plurality of images to align regions of said plurality of images and identify a plurality of misaligned regions of said plurality of images;
    (b') segmenting said misaligned regions to produce segmented regions;
    (c') iteratively aligning and segmenting the misaligned regions until a remaining misaligned region fulfills a criteria that identifies the remaining misaligned region as motion within said plurality of images.

14. The method of claim 13 wherein said segmenting step forms a layer containing said segmented regions.

15. The method of claim 14 wherein the segmenting step uses a segmentation mask to track the segmented regions over time.

16. The method of claim 13 wherein step (c') further comprises the step of:

determining if at least one of said plurality of misaligned regions is a moving object by determining if the misaligned region is consistent with the segmented regions.

17. The method of claim 16 wherein a misaligned region is deemed inconsistent with the segmented region if the misaligned region produces discontinuities in the two-dimensional motion everywhere along a boundary of the misaligned region.

18. The method of claim 16 further comprising the step of:

determining whether the misaligned region contains depth discontinuities that identify the misaligned region as a moving object.

19. The method of claim 12 wherein the processing step (d) further comprises the step of:

identifying a portion of the parallax motion component that does not conform to the parallax rigidity constraint as the moving object.

* * * * *